United States Patent [19]

Wise

[11] 4,343,713

[45] Aug. 10, 1982

[54] PARTICULATE COMPOSITION

[75] Inventor: Rodney M. Wise, Cincinnati, Ohio

[73] Assignee: The Procter & Gamble Company, Cincinnati, Ohio

[21] Appl. No.: 202,038

[22] Filed: Oct. 29, 1980

[51] Int. Cl.$^3$ .......................... B01J 1/04; C11D 3/12; C11D 9/18; C11D 11/00

[52] U.S. Cl. .................................. 252/92; 23/313 R; 252/90; 252/91; 252/109; 252/116; 252/131; 252/132; 252/134; 252/174.13; 252/174.14; 252/174.21; 252/174.25; 252/179; 264/117

[58] Field of Search ..................... 23/313 R; 264/117; 252/89.1, 90, 91, 92, 109, 116, 131, 132, 134, 140, 174, 174.13, 174.14, 174.21, 174.25, 179

[56] References Cited

U.S. PATENT DOCUMENTS

| | | | |
|---|---|---|---|
| 3,852,211 | 12/1974 | Ohren | .................... 252/110 |
| 4,096,081 | 6/1978 | Phenicie et al. | . |
| 4,113,644 | 9/1978 | Ashcraft | .................... 252/91 |
| 4,126,574 | 11/1978 | Reinwald et al. | . |
| 4,151,189 | 4/1979 | Rubin et al. | . |
| 4,201,689 | 5/1980 | Smolka et al. | . |
| 4,231,887 | 11/1980 | Denny | .................... 252/179 |

FOREIGN PATENT DOCUMENTS 2736903  2/1978  Fed. Rep. of Germany ...... 252/179

*Primary Examiner*—Dennis L. Albrecht
*Attorney, Agent, or Firm*—Robert B. Aylor; Richard C. Witte; Thomas H. O'Flaherty

[57] ABSTRACT

A composition which contains aluminosilicate detergency builder materials in an intimate mixture with an inorganic salt, a water-soluble or water-dispersable organic agglomerating compound having a melting point between 10° C. and 100° C., and a water soluble soap of a fatty acid.

10 Claims, No Drawings

PARTICULATE COMPOSITION

BACKGROUND OF THE INVENTION

1. Field of the Invention

The present invention relates to compositions of matter which are useful as detergency builders or for water softening.

2. Description of the Art

Aluminosilicates which have high calcium and magnesium exchange rates and capacity have been added to water softening and detergent products to remove water hardness. Effective removal of calcium and magnesium ions from water, when considered in the context of detergent products, is important in that those ions can precipitate anionic surfactants rendering the former less effective in fabric cleaning. Moreover if the calcium and magnesium ions are not removed from water used for washing, these ions will interact with soils on the fabrics thus interferring with soil removal.

Water softening and detergent products utilizing the aluminosilicates which form a part of the present invention, are described in several references. For instance, Corkill et al in U.S. patent application Ser. No. 450,266, filed Mar. 11, 1974, describes the use of such aluminosilicates which are added to detergent compositions by admixing the aluminosilicate with the remaining components, or by spray drying the aluminosilicate with the remaining components of the composition.

U.S. Pat. No. 3,985,669, Krummel et al, incorporated herein by reference, describes the formulation of a detergent composition containing aluminosilicates and alkali metal silicates. In Krummel et al the silicates are present at a very low level to avoid the interaction with the aluminosilicate. This product is formed by spray drying all of the components in the composition including the aluminosilicate and the alkali metal silicate.

Further descriptions of aluminosilicate materials having utility for water softening in detergent compositions are found in Belgian Pat. Nos. 813,581 and 828,753, South African patent application No. 74/2862, South African patent application No. 74/3319, and Netherlands patent application No. 74/03383.

Materials which are suitable as organic agglomerating compounds have been described in U.S. Pat. No. 4,113,644 by Ashcraft; in U.S. Pat. No. 4,096,081, Wise et al; and in U.S. Pat. No. 2,806,001, issued on Sept. 10, 1957, said patents being incorporated herein by reference.

As discussed in U.S. Pat. No. 4,096,081 agglomerates of aluminosilicates are a desirable way to incorporate aluminosilicates into detergent products. However, this invention improves the dispersibility of the agglomerates of the U.S. Pat. No. 4,096,081.

Throughout the specification and claims, percentages, parts, and ratios are by weight and temperatures are in degrees centigrade unless otherwise indicated.

SUMMARY OF THE INVENTION

A free-flowing particulate water-softening composition comprising an intimate mixture of:

(a) from about 60 parts to about 95 parts of an aluminosilicate selected from the group consisting of:
(i) an amorphous compound of the formula $$Na_x(xAlO_2 \cdot ySiO_2)$$

wherein x has a value of from 1 to 1.2 and y is 1, said amorphous material being further characterized by an $Mg^{++}$ exchange capacity of at least about 50 mg eq. $CaCO_3$/g (one milliequivalent/g) and, (ii) a compound of the formula $$Na_z[(AlO_2)_z \cdot (SiO_2)_j]kH_2O$$

wherein z and j are integers of a least 6; the molar ratio of z to j is in the range of from 1.0 to about 0.5 and k is an integer from about 15 to about 264; said aluminosilicate ion exchange material having a particle size diameter from about 0.1 micron to about 100 microns; a calcium ion exchange capacity of at least about 200 mg eq. $CaCO_3$/g (four milliequivalents/g.); and a calcium ion exchange rate of a least about 2 grains/-gallon/minute gram and mixtures thereof;

(b) from about 0.3 parts to about 5 parts of an organic agglomerating compound and soap cure dispersant having a melting point of from 10° C. to 100° C.;

(c) from about ½ to about 5 parts of an inorganic salt;

(d) from about ½ to about 5 parts of a water soluble soap of a fatty acid containing from about 12 to about 22 carbon atoms with no more than about a quarter of said soap being saturated, and (e) balance $H_2O$.

DETAILED DESCRIPTION OF THE INVENTION

The aluminosilicate compounds of the formula described in (a) (i) in the Summary are prepared as described in U.S. Pat. No. 4,096,081, incorporated herein by reference.

It is highly preferred that the sodium form of the instant aluminosilicates be used for optimal builder use.

An essential feature of the ion exchange builder materials herein is that they be in a hydrated form, i.e., contain at least about 10% by weight of water. The preferred crystalline aluminosilicates are Zeolites A, X and P and mixtures thereof. Highly preferred crystalline aluminosilicate Zeolite A herein contains the theoretical maximum of from about 18% to about 22% (wt.) water in its crystal matrix. It has been found, for example, that less highly hydrated aluminosilicates, e.g., those with about 6% water, do not function effectively as ion exchange builders when employed in the context of a laundry detergent composition.

Another essential feature of the ion exchange builder materials herein is their particle size range. Of course, the amorphous aluminosilicates herein inherently have a small particle size (ca. 0.01 micron-5 micron diameter). The crystalline materials also desirably have a small particle size in the range disclosed herein. Proper selection of small particle sizes results in fast, highly efficient builder materials. Moreover, the preferred small particle size of the aluminosilicates herein, less than about 10 microns, accounts for the fact that they are not noticeably deposited on fabrics from an aqueous laundering liquor. This non-deposition is, of course, highly desirable when the aluminosilicates are employed as detergent builders for fabrics.

Both the crystalline and amorphous aluminosilicate ion exchangers herein are further characterized by their calcium ion exchange capacity which is at least about 200 mg. equivalent of $CaCO_3$ hardness/gram of aluminosilicate, calculated on an anhydrous basis, and which generally lies within the range of about 300 mg. eq./g. to about 352 mg. eq./g.

The ion exchange materials herein are further characterized by their calcium ion exchange rate which is at least about 2 grains ($Ca^{++}$)/gal./min./g. of aluminosilicate (anhydrous basis), and lies within the range of about 2 gr./gal./min./g. to about 6 gr./gal./min./g., based on calcium ion hardness. Optimum aluminosilicates for builder purposes exhibit a $Ca^{++}$ exchange rate of at least about 4 gr./gal./min./g.

The amorphous aluminosilicate ion exchangers herein are further characterized by their magnesium exchange capacity, which is at least about 50 mg. eq. of $CaCO_3$ hardness/gram of aluminosilicate, calculated on an anhydrous basis, and which generally lies within the range of about 50 mg. eq./g. to 150 mg.eq./g. or greater.

The amorphous ion exchange materials herein are still further characterized by their magnesium ion exchange rate which is at least about 1 grain ($Mg^{++}$)/gal./min./g. of aluminosilicate (anhydrous basis), and lies within the range 1 gr./gal./min./g. to about 3 gr./gal./min./g., based on magnesium ion hardness. Optimum aluminosilicates for builder purposes exhibit a magnesium exchange rate of at least about 2 gr./gal./min./g.

The ion exchange properties of the aluminosilicates herein can conveniently be determined by means of a calcium ion electrode and a divalent ion electrode. In this technique the rate and capacity of $Ca^{++}$ and $Mg^{++}$ uptake from an aqueous solution containing a known quantity of $Ca^{++}$ and $Mg^{++}$ ions are determined as a function of the amount of aluminosilicate ion exchange material added to the solution. More specifically, the ion exchange rates of the amorphous and mixed amorphous-crystalline aluminosilicates herein are determined as follows. The aluminosilicate prepared in the foregoing manner is added in the sodium form to 150 ml. of aqueous solution containing 4.7 gr./gal. $Ca^{++}$ and 2.4 gr./gal. $Mg^{++}$ (measured as $CaCO_3$) at a concentration of 0.06% (wt.), pH of 10.0, and with gentle stirring of the solution. The rate of calcium depletion is measured using the calcium electrode (commercially available; Orion) and the rate of total calcium and magnesium depletion is determined using the general divalent cation electrode. Magnesium ion removal is thereafter determined by the difference in readings. The rate of depletion is determined for each cation by taking measurements at appropriate time intervals. Total depletion from the solution is calculated after ten minutes, which corresponds to the normal wash time in an aqueous laundering process. Rate curves for calcium depletion, magnesium depletion and mixed calcium and magnesium depletion can be plotted as gr./gal.v. time. The slope of the line connecting the origin and the ½ minute value of hardness is a convenient approximation of the rate.

Calcium exchange capacity of the aluminosilicates herein can be determined by a simple titration method. In practice the aluminosilicate sample is equilibrated with a known excess of $Ca^{++}$. After equilibration and uptake of the calcium ion, the excess calcium ion remaining in solution is determined by a standard titration with EDTA, using a standard Eriochrome Black T Indicator. Magnesium ion capacity is determined titrimetrically, in similar fashion.

As noted hereinabove, both the crystalline and amorphous components of the aluminosilicates herein exhibit excellent rates of exchange an capacities for calcium ions. Moreover, the amorphous material herein additionally provides rapid and efficient uptake of magnesium ions. Accordingly, a mixture of crystalline and amorphous material provides mixed $Ca^{++}/Mg^{++}$ hardness control.

Although completely hydrated aluminosilicate ion exchange materials are preferred herein, it is recognized that the partially dehydrated aluminosilicates having the general formula given hereinbefore are also excellently suitable for rapidly and effectively reducing the water hardness during the laundering operation. Of course, in the process of preparing the instant aluminosilicate ion exchange material, reaction-crystallization parameter fluctuations can result in such partially hydrated materials. As pointed out previously, aluminosilicates having about 6% or less water do not function effectively for the intended purpose in a laundering context. The suitability of particular partially dehydrated water-insoluble aluminosilicates for use in the compositions of this invention can easily be ascertained and only involves routine testing as, for example, described herein ($Ca^{++}$ ion exchange capacity; rate of exchange; particle size measurement).

The water-insoluble, inorganic aluminosilicate ion exchange materials prepared in the foregoing manner are characterized by a particle size diameter from about 0.1 micron to about 100 microns. Preferred ion exchange materials have a particle size diameter from about 1 micron to about 10 microns. Additional preferred water-insoluble aluminosilicates herein are characterized by a particle size diameter from about 0.2 microns to about 0.7 microns. The term "particle size diameter" herein represents the average particle size diameter of a given ion exchange material as determined by conventional analytical techniques such as, for example, microscopic determination by scanning electron microscope (SEM).

The organic agglomerating and soap curd dispersing compound of the present invention is generically described as a material having a melting point between 10° C. and 100° C. and a molecular weight of from about 200 to 30,000. The organic agglomerating compound is further characterized in that it is water-soluble or water-dispersible in the temperature range ordinarily employed in washing fabrics, normally about 20° C. to 100° C. Thus while many organic compounds could be utilized to form the agglomerate only those compounds having the above-described properties are suitable for maintaining the agglomerate during its shelf-life and for ensuring that the aluminosilicate will be rapidly spread throughout the wash solution. Exemplary materials useful as agglomerating compounds are described below.

(1) For instance, the polyethylene glycols and polypropylene/polyethylene glycols having a molecular weight of from about 950 to about 30,000 may be obtained from the Dow Chemical Company of Midland, Michigan. Such compounds for example, having a melting point within the range of from about 10° to about 100° C. preferably at least 30° C., may be obtained at molecular weights of from about 800 to about 20,000. Such compounds are formed by the polymerization of ethylene glycol or propylene glycol with the requisite number of moles of ethylene or propylene and ethylene oxides to provide the desired molecular weight and melting point of the respective polyethylene glycol and polypropylene/polyethylene glycol.

When the organic agglomerating agent of the present invention is a copolymer containing ethylene oxide and propylene oxide units there should be enough ethylene oxide to produce a soap curd dispersant. In this instance the starting compounds will either be ethylene glycol or propylene glycol which is polymerized with a mixture of ethylene and propylene oxide. If desired, the condensation product of ethylene oxide and propylene oxide can be modified to provide a precise mixture of the desired number of molecular units of each species in the overall molecule. This can be accomplished by using blocking agents which are later removed thus allowing one end of the molecule to contain either an ethylene oxide or a propylene oxide moiety. It is further possible to separately prepare polyethylene glycols and then to react that product with a polypropylene glycol thus forming a large copolymer having one hydrophobic (polypropylene) terminus and the other terminus a hydrophilic moiety (polyethylene).

Such compounds are readily available from commercial sources in a molecular weight range of from about 950 to 4000. Examples of compounds of this type include certain commercially available Puronic° which are discussed in the booklet "The Wonderful World of PLURONIC Polyols°" (1971) BASF Wyandotte Corporation (herein incorporated by reference).

The preferred organic agglomerating compounds are polyethylene glycols having a molecular weigth of from about 800 to about 12,000, preferably from about 3,000 to about 9,000. A particularly useful material is polyethylene glycol having a molecular weight of about 8000. Such compounds have a melt point in the range of from about 10° C. to about 100° C., preferably from about 30° to about 80° C.

The polyethylene and mixed glycols are conveniently referred to by means of the structural formula

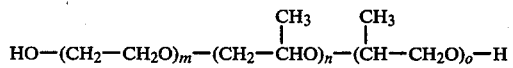

wherein m, n, and o are numbers satisfying the molecular weight, soap curd dispersant, and temperature requirements given above.

(2) The condensation products of one mole of a saturated or unsaturated, straight or branched chain fatty alcohol or carboxylic acid having from about 10 to about 18 carbon atoms with from about 5 to about 30 moles or higher of ethylene oxide, which liquify between the temperatures of about 10° C. and about 100° C. and are solid at temperatures below about 10° C. The acid moiety can consist of mixtures of acids in the above delineated carbon atom range or it can consist of an acid having a specific number of carbon atoms within this range. The condensation product of one mole of coconut fatty acid having the approximate carbon chain length distribution of 2% $C_{10}$, 66% $C_{12}$, 23% $C_{14}$, and 9% $C_{16}$ with 15 moles of ethylene oxide is a specific example of a nonionic containing a mixture of different chain length fatty acid moieties. Other specific examples of nonionics of this type are: the condensation products of one mole of palmitic acid with 20 moles of ethylene oxide; the condensation product of one mole of myristic acid with 35 moles of ethylene oxide; the condensation product of one mole of oleic acid with 45 moles of ethylene oxide; and the condensation product of one mole of stearic acid with 30 moles of ethylene oxide.

(3) Two specific examples of nonionic surface active agents suitable for use in this invention and not specifically classified herein are polyoxyethylene glyceride esters having a hydrophilic-lipophilic balance (HLB) of 18.1 and polyoxyethylene lanolin derivatives having an HLB of 17.0. Both nonionics are manufactured by Atlas Chemical Industries, Inc.; the trade name of the former is G-1300 and the trade name of the latter is G-1795.

(4) The condensation products of one mole of alkyl phenol wherein the alkyl chain contains from about 8 to about 18 carbon atoms with from about 20 to about 50 moles of ethylene oxide. Specific examples of these nonionics are the condensation products of one mole of decyl phenol with 40 moles of ethylene oxide; the condensation products of one mole of dodecyl phenol with 35 moles of ethylene oxide; the condensation products of one mole of tetradecyl phenol with 35 moles of ethylene oxide; the condensation products of one mole of hexadecyl phenol with 30 moles of ethylene oxide.

Mixtures of polyethylene glycol and alkyl polyethoxylates are especially desirable when the soap is only marginally soluble (contains higher levels of saturated soap). The alkyl polyethoxylate, or similar detergent surfactant/curd dispersant, is more effective as a curd dispersant than the polyethylene glycol alone. The presence of some polyethylene glycol is desirable, however. Ratios of from about 3:1 to 1:3 are useful when the level of saturates in the soap is about 10% or greater.

The inorganic salts are water-soluble to promote dispersion of the aluminosilicate to rapidly control the water-hardness. Examples of such inorganic salts include those having alkali metal cations such as sodium or potassium, and having as anions thereof sulfates, chlorides, carbonates, bicarbonates, aluminates and phosphates, and mixtures thereof.

Preferred inorganic salts include sodium sulfate, sodium carbonate, magnesium sulfate, potassium sulfate, sodium orthophosphate, sodium pyrophosphate, sodium tripolyphosphate, and sodium hexametaphosphate. Especially preferred are sodium sulfate and sodium carbonate. Alkali metal silicates are not desired inorganic salts because of their ability to polymerize the aluminosilicate, leading to deposits upon washed fabrics.

The Soap

The fatty acid soap of this invention contains from about 12 to about 22 carbon atoms, preferably in a straight chain configuration. Preferably the number of carbon atoms in the fatty acid soap is from about 16 to about 18.

This soap, in common with other anionic detergents and other anionic materials in the detergent compositions of this invention, has a cation which renders the soap water-soluble and/or dispersible. Suitable cations include sodium, potassium, ammonium, monoethanolammonium, diethanolammonium, triethanolammonium, tetramethylammonium, etc. cations. Sodium ions are preferred although in liquid formulations potassium, monoethanolammonium, diethanolammonium, and triethanolammonium cations are useful. The soap can be formed during the formation of the particulate water-softening composition by adding fatty acid and an alkaline material.

A level of at least about ½% of the fatty acid soap is desirable to provide a noticeable improvement in dispersibility of the particulate composition. Preferred levels of fatty acid soap are from about ½ to about 5 parts, preferably from about 1 to about 3 parts, most preferably about 2 parts.

The soap is essentially unsaturated with no more than about a quarter of the soap being saturated. The aluminosilicate assists in keeping the unsaturated soap from forming an insoluble curd. Mono-, di-, and triunsaturated fatty acids are all essentially equivalent so it is preferred to use mostly monounsaturated soaps to minimize the risk of rancidity. Suitable sources of unsaturated fatty acids are well known. For example, see Bailey's Industrial Oil and Fat Products, Third Edition, Swern, published by Interscience Publisher (1964), incorporated herein by reference.

Preferably, the level of saturated soaps is kept as low as possible, preferably less than about 20% of the unsaturated soap. However, low levels of saturated soaps can be added.

When the particles comprising the aluminosilicate, the inorganic salt, the organic agglomerating compound and the soap are to be incorporated into a detergent composition, an additional surface active agent (surfactant) will normally be included as a portion of the overall detergent composition. The agglomerates of this invention can be added to a wash solution separately; dry admixed with the remainder of the composition; a surfactant can be sprayed onto the agglomerate which then acts as a "carrier"; or the agglomerate can be added to a detergent crutcher mix containing little or no silicate (2% or less solids).

The additional surfactant compound may be any of a wide range of anionic, nonionic, zwitterionic, ampholytic and cationic compounds. For instance, such materials include the water-soluble salts of alkyl sulfates, alkyl sulfonates, alkyl ethoxy sulfates, alkyl benzene sulfonates, olefin sulfonates, and alpha-sulfocarboxylic acids. Other surfactant materials include nonionics which are generally a condensation product of a fatty alcohol and ethylene oxide or alkylbenzene ethoxylate condensates. Builders such as alkali metal carbonates, phosphates, sulfates, and silicates may also be present with the surfactant.

Exemplary detergent components which may be used in the present invention are those described in U.S. Pat. No. 3,852,211 to Ohren, issued Dec. 3, 1974, which is incorporated herein by reference.

Composition Preparation

The preparation of the particulate containing the aluminosilicate, the inorganic salt, the organic agglomerating compound and the soap is described as follows:
 (a) dispersing the normally solid agglomerating compound into water;
 (b) dispersing the inorganic salt and the soap into the agglomerating compound;
 (c) admixing into the dispersed agglomerating compound the aluminosilicate of the present invention, thereby forming an intimate mixture; heat mixture to at least 170° F. to thoroughly disperse soap; and
 (d) solidifying the resultant mass to form the particulate. Alternatively, the agglomerating compound and soap can be sprayed onto a bed of the aluminosilicate and the inorganic salt. Water may be added to the mixture of the agglomerating compound, the inorganic salt, and the aluminosilicate to facilitate mixing. The excess water is then driven off by heating to form the particulate.

In an especially preferred method the following steps are used:
 (a) add sulfuric acid to aluminosilicate liquor from synthesis reaction to neutralize excess caustic (not to drop pH below about pH 9) and form sodium sulfate;
 (b) disperse soap and agglomerating compound into slurry;
 (c) heat to at least 170° to disperse soap; and
 (d) spray dry or flash-dry.

A preferred method of preparing the particulate of the present invention is to spray the mixture of the aluminosilicate, the inorganic salt, the soap and the organic agglomerating compound to form granules of the size compatible with normal detergent particles. It is to be understood, however, that the product can take several forms, e.g. cakes, flakes, prills, or granules which are reduced by conventional methods to the appropriate size.

A preferred method of preparing the particulate of the present invention is by spray-drying or spray cooling the mass to form the particulate. It is essential when spray-drying is employed that the aluminosilicate should not be dehydrated beyond the point where its ion exchange capacity is adversely affected. It is further important in a spray-drying operation that the organic agglomerating compound should not be heated to the point at which it begins to decompose. A small amount of anionic surfactant on the order of 0.5–4% by weight of the particulate may be used to aid in density control of the particulate.

When a spray-drying operation is used to prepare the agglomerate, the apparatus for conducting the drying operation may be a multilevel spray-drying tower such as that described in U.S. Pat. Nos. 3,629,950 and 3,629,955 issued to Davis et al, both of which are incorporated herein by reference.

In preparing the particulate of the present invention the organic agglomerating compound will be present at from about 0.3 part to about 5 parts, preferably from about 0.5 part to about 1.2 parts by weight while the aluminosilicate will be present at from about 60 parts to about 95 parts, preferably from about 70 parts to about 90 parts by weight.

The inorganic salts, which promote lessened friability, are used at a level of from about 0.5 part to about 5 parts, preferably from about 1 part to about 3.5 parts and most preferably from about 1½ parts to about 3 parts by weight in the particulate. Larger amounts of the inorganic salts may be utilized in the particulate, however, the benefit reaches a maximum at about 3 parts and additional amounts merely take up more formula room.

The soap should be present at a level of from about ½ to about 5 parts, preferably from about 1 to about 3 parts to provide the improved dispersibility.

Composition Utilization

When the particulate of the present invention is utilized as a water softener for laundering purposes, it is simply added to the wash tub or washing machine, preferably before the fabrics and the detergent composition are introduced and after the water has been introduced into the container.

When the particulate of the present invention is used as part of a complete detergent product with a surfactant, the overall product is desirably added to the wash tub or the washing machine before the fabrics and after the water has been added.

The amount of the particulate utilized as a water softening pretreatment is simply an amount sufficient to remove most of the calcium and/or magnesium ions present in the wash water. As the product of the present invention normally has a density of from about 0.4 gram per cc to about 0.7 gram per cc, sufficient usage of the product will under most United States conditions be satisfied by the use of from about ¼ cup to about 1 cup. Under continental European washing conditions where the water hardness is somewhat greater, the product will normally be used at a level of from about 0.5 cup to about 3 cups.

Laundry detergent products of the present invention as used under U.S. washing conditions at from about ½ to about 1½ cups and from about 1 cup to about 3 cups under European washing conditions.

The agglomerate of this invention, when added to a spray-dried detergent granule containing a surfactant to give an agglomerate level of from about 5% to about 80%, preferably from about 10% to about 60% by weight of the total composition, provides a complete detergent composition with little or no apparent formation of insolubles. This is especially important when the spray-dried detergent granule contains large amounts of silicates. In order to avoid segregation, the agglomerate should have a size that is compatible with the detergent granule, e.g., not less than about 100 microns in diameter, preferably not less than about 150 microns in diameter. The agglomerates of this invention do not break down unacceptably under ordinary handling and shipping.

Particle size can be adjusted by sieving and recycling or by adjusting spray drying pressure and nozzle size.

The following are Examples of the present invention:

EXAMPLE I

Detergent compositions were made with the intent of increasing the thoroughness of zeolite builder dispersion in wash water. The expected benefits of increased dispersion are (1) reduced incidence of insoluble aggregates on washed fabrics, and (2) increased rate of zeolite availability for complexation of water hardness.

Sample compositions were produced (see samples B through E below), by mixing all components in an aqueous slurry of about 50-60% total water. The slurry was heated to a temperature of about 170° F. or above to assure thorough mixing of the soap. This mixture was then dried in a thin film in a 70° C. oven until only about 18-20% total water remained. The water of hydration in the Zeolite A (Arogen 2000 by Huber Co.) is generally not removed under these conditions. The dried cake was granulated and screen through a 14 mesh (Tyler) screen. The particle size was mostly greater than about 150 microns in diameter and the density was about 0.58 g./cc.

The method used for evaluating degree of dispersion involved Nephelometer Turbidity Unit (NTU) measurements of wash water concentrations (0.3 g. active zeolite/l. city water at about 9 grains/gallon hardness). A water sample was grabbed after four minutes of normal wash agitation with the zeolite-containing composition present. A higher turbidity reading indicates greater exposed particle surface and thus more effective dispersion. The amount of each composition was adjusted to deliver a dry zeolite wash concentration of 0.3 g./l. in each case.

| | Composition | | | | |
|---|---|---|---|---|---|
| | A | B | C | D | E |
| Component | | | | | |
| Zeolite A, dry basis | 80.0 | 66.5 | 74.3 | 78.4 | 73.4 |
| PEG 8000 (polyethylene glycol; M.W. 8000) | — | — | 3.4 | — | 2.6 |
| Sodium sulfate | — | 17.0 | 3.7 | — | 3.7 |
| Sodium oleate soap (10% saturated soap) | — | — | — | 2.0 | 2.0 |
| Water | 20.0 | 16.5 | 18.6 | 19.6 | 18.3 |
| Turbidity, NTU | | | | | |
| Initial Reading | 80 | 110 | 165 | 125 | 290 |
| 30 min. Static Reading | 40 | 60 | 90 | 100 | 150 |

It is known that electrolytes alone aid in dispersion of aluminosilicates in an aqueous medium, and this is seen in comparing A (a commercial sample as received) and B.

The addition of a binding and wetting agent, polyethylene glycol (PEG 8000), in D (ref. U.S. Pat. No. 4,096,081) improves dispersibility to the level seen with a typical full detergent composition (nonphosphate), which would give, for example, turbidities of 175 NTU initially and 98 NTU at 30 min.

Soap was added alone to the zeolite in D to produce a roughly comparable improvement. But when soap was added in addition to the components of C, a much greater dispersion benefit was realized.

EXAMPLE II

The sample preparation and test procedure of the previous example were then used to examine more fully the role of the polyethylene glycol in the compositions above. Sodium carbonate was used as the electrolyte in place of sodium sulfate.

| | Composition | |
|---|---|---|
| | F | G |
| Component | | |
| Zeolite A, dry basis | 76.0 | 73.9 |
| PEG 8000 | — | 2.6 |
| Sodium carbonate | 3.0 | 3.0 |
| Sodium oleate soap (10% saturated soap) | 2.0 | 2.0 |
| Water | 19.0 | 18.5 |
| Turbidity, NTU | | |
| Initial Reading | 270 | 295 |
| 30 min. Static Reading | 140 | 215 |

The addition of the carbonate salt in F to the composition of D above shows considerably increased dispersion, and inclusion of the PEG shows further improvement, especially at 30 minutes.

EXAMPLE III

Type of soap was then examined as a variable in the above compositions. The following samples were prepared and tested as above:

| | Composition | | |
|---|---|---|---|
| | H | I | J |
| Component | | | |
| Zeolite A, dry basis | 73.4 | 73.4 | 73.4 |
| PEG 8000 | 2.6 | 2.6 | 2.6 |
| Sodium sulfate | 3.7 | 3.7 | 2.7 |
| Sodium oleate (10% saturated) | — | — | 2.0 |
| Soybean-derived sodium soap | | | |

|  | Composition | | |
| --- | --- | --- | --- |
|  | H | I | J |
| (20% saturated) | 2.0 | — | — |
| Sodium tallowate (60% saturated) | — | 2.0 | — |
| Nonionic ethoxylate ($C_{12-13}E_{6.5}$) | — | — | 1.0 |
| Water | 18.3 | 18.3 | 18.3 |
| Turbidity, NTU |  |  |  |
| Initial Reading | 260 | 48 | 295 |
| 30 min. Static Reading | 150 | 23 | 240 |

Level of saturated fatty acid in the $C_{14}$ to $C_{20}$ range of carbon chain length was evaluated above. Though up to 20% saturated produces approximately the same results in sample H, substantially higher levels, as in sample I, Example III, show loss of benefit. Since the addition of an effective lime-soap-dispersing surfactant in sample J shows even further improved dispersion, it is felt that the tendency of saturates to increase precipitation of soap stocks by water hardness is the effect which limits utility of the higher saturated soap levels.

EXAMPLE IV

Compositions containing zeolite builder were spray dried for the purpose of providing a highly dispersible granular additive for a laundry detergent function.

Slurries of ingredients were prepared in quantities of about 450 to 550 pounds as otherwise described in Example I. After heating to about 175° F., the slurries were pressure-atomized into a pilot scale (10' diameter) spray drying tower with inlet air at about 500° F. and dried to the following nominal compositions:

|  | Weight % | |
| --- | --- | --- |
| Component | A | B |
| Zeolite A, dry basis | 74.5 | 72.5 |
| PEG 8000 | 3.4 | 3.4 |
| Sodium sulfate | 3.7 | 3.7 |
| Sodium oleate (10% saturated) | — | 2.0 |
| Water | 18.4 | 18.4 |

The density was about 0.45 g./cc. and the particle size was about 90% greater than about 150 microns in diameter.

The two compositions were tested for dispersibility by examining levels of residual undispersed fragments in water after ten minutes of agitation in a standard Terg-O-Tometer machine. A sample (1.5 g.) was added to one liter of city water (70° F., about 9 grains/gallon hardness level).

The resulting wash water was poured through a black fabric (about 3½ inches diameter) which has been seen to pass particles of about 45 micron diameter or less and retain larger fragments. The fabrics are graded against a visual scale, photographically standardized. A grading scale of 1 to 10 is established, wherein a "10" grade represents a totally clean fabric and a "1" signifies a fabric fully covered with residual fragments. Results with the above samples:

| Sample | "Black Fabric Grade" |
| --- | --- |
| A | 7.0 |
| B | 9.0 |

Additionally, turbidity was visually examined in water and B was substantially more turbid. Readings as detailed above were taken with B and are seen to roughly compare with a comparable oven-dried sample (E in Example I):

| Turbidity, NTU | Sample B |
| --- | --- |
| Initial Reading | 255 |
| 30 min. Static Reading | 200 |

EXAMPLE V

A zeolite-containing composition was prepared as in the preceding example, except that the soap was formed in the slurry with the neutralization of fatty acid by sodium carbonate. Oleic acid (Emersol 220 from Emery Industries) was added to water with the heat maintained about 180° F. Sodium carbonate was added and $CO_2$ was released as the reaction occurred. The other ingredients were added and the slurry was spray dried as mentioned earlier.

The resultant composition exhibits properties similar to sample B in the example above. Final composition is the same, except for equal substitution of sodium carbonate for sodium sulfate.

EXAMPLE VI

The composition B of Example IV was dry blended into a spray dried base granule of the following composition:

|  | Percentage |
| --- | --- |
| Sodium $C_{11.8}$ alkylbenzene sulfonate | 4.76 |
| Sodium $C_{14-16}$ alkylpolyethoxylate$_{1.0}$ sulfate | 11.48 |
| Sodium tallow alkyl sulfate | 3.36 |
| Sodium silicate (2.0r) | 8.4 |
| Sodium carbonate | 18.2 |
| Sodium sulfate | 47.3 |
| Trisodium sulfosuccinate | 2.8 |
| Water and minors | Balance |

The blend rate is as follows:

| Component | Weight % |
| --- | --- |
| Base granule, above | 72.26 |
| Zeolite Composition B, Example IV | 27.60 |
| Perfume | 0.14 |
| Total | 100.00% |

The resulting detergent product provides excellent results when used as a water softening laundering product.

EXAMPLE VII

The zeolite composition of Example VI is metered into a fluidized bed along with other dry ingredients and nonionic surfactant, minors, and perfume are sprayed on.

| Composition | Percentage |
| --- | --- |
| Zeolite composition from Example VI | 35 |
| Ethoxylated nonionic ($C_{12-13}E_{6.5}$) | 15 |
| Sodium tripolyphosphate, granular | 25 |
| Sodium carbonate, granular | 10 |
| Sodium sulfate, granular | 14 |
| Water, colorants, perfume, brighteners | 1 |

| Composition | Percentage |
| --- | --- |
| Total | 100 |

What is claimed is:

1. A free-flowing particulate water-softening composition in an intimate mixture comprising:
   (a) from about 10 parts to about 95 parts of an aluminosilicate selected from the group consisting of:
      (i) an amorphous compound of the formula $$Na_x(xAlO_2 \cdot ySiO_2)$$

wherein x has a value of from 1 to 1.2 and y is 1, said amorphous material being further characterized by an $Mg^{++}$ exchange capacity of at least about 50 mg. eq. $CaCO_3/g$;
      (ii) a compound of the formula $$Na_z[(AlO_2)_z \cdot (SiO_2)_j]kH_2O$$

wherein z and j are integers of at least 6; the molar ratio of z to j is in the range of from 1.0 to about 0.5 and k is an integer from about 15 to 264; said aluminosilicate ion exchange material having a particle size diameter from about 0.1 micron to about 100 microns; a calcium ion exchange capacity of at least about 200 mg eq./g; and a calcium ion exchange rate of at least about 2 grains/gallon/minute gram and mixtures thereof;
   (b) from about 0.3 part to about 5 parts of an organic agglomerating compound and soap curd dispersant having a melting point of from about 10° C. to about 100° C.; and
   (c) from about ½ part to about 5 parts of a inorganic salt;
   (d) from about ½ to about 5 parts of a water soluble soap of a fatty acid containing from about 12 to about 22 carbon atoms with no more than about a quarter of said soap being saturated; and
   (e) balance water.

2. The composition of claim 1 wherein the organic agglomerating compound is present at a level of from 0.5 part to about 1.2 parts and has the structural formula $$HO-(CH_2CH_2O)_m-(CH_2-\overset{CH_3}{\underset{|}{C}HO})_n(\overset{CH_3}{\underset{|}{C}H}-CH_2O)_oH$$

wherein m, n, and o are each either 0 or numbers such that the compound has a molecular weight of from about 800 to about 30,000.

3. The composition of claim 2 wherein the aluminosilicate is present at from about 60 to about 90 parts.

4. The composition of claim 3 wherein the aluminosilicate is selected from the group consisting of Zeolites A, X, P and mixtures thereof.

5. The composition of claim 4 wherein the inorganic salt is selected from the group consisting of sodium sulfate, potassium sulfate, sodium carbonate, potassium carbonate, potassium sulfate, magnesium sulfate, sodium orthophosphate, sodium pyrophosphate, sodium tripolyphosphate, sodium hexameta phosphate and mixtures thereof.

6. The composition of claim 5 wherein the organic agglomerating compound is polyethylene glycol.

7. The composition of claim 6 wherein the polyethylene glycol has a molecular weight of about 8000.

8. The composition of claims 1, 4, 5, and wherein the soap contains from about 16 to about 18 carbon atoms.

9. The composition of claim 1 containing from about 1 to about 3 parts soap.

10. A detergent composition comprising from about 5% to about 80% of the agglomerate of claim 1 and from about 20% to about 95% of a spray-dried detergent granule containing a surfactant.

* * * * *